July 8, 1924.
W. K. MATTERN
1,500,463
ADJUSTABLE SINKER
Filed Dec. 22, 1923
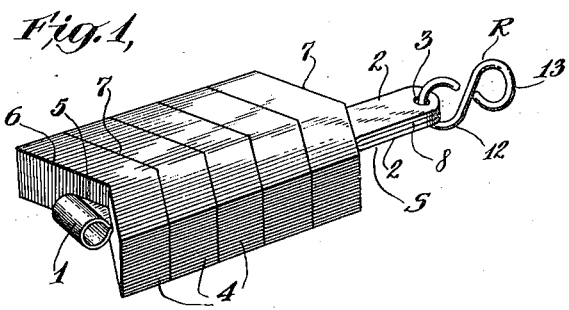
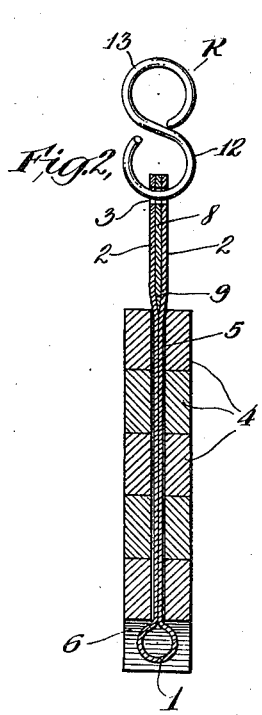
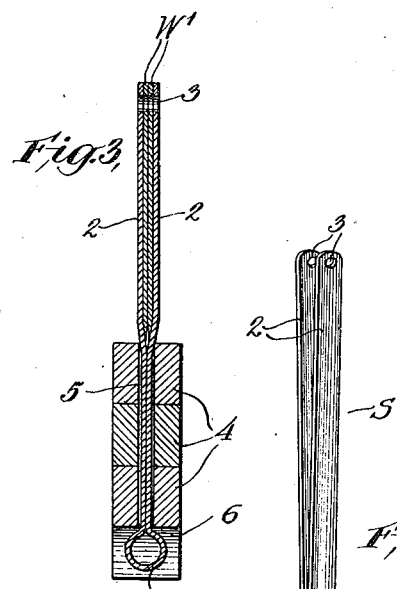
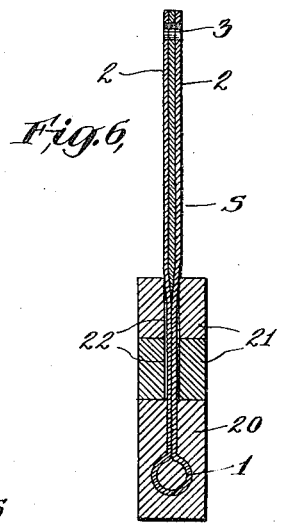
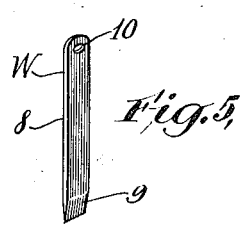
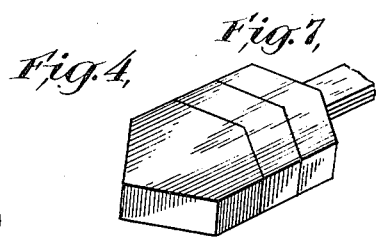
INVENTOR
W. K. Mattern
BY
Meyers & Cavanagh
ATTORNEYS Patented July 8, 1924.

1,500,463

UNITED STATES PATENT OFFICE.

WILLIAM K. MATTERN, OF GERMANTOWN, PENNSYLVANIA.

ADJUSTABLE SINKER.

Application filed December 22, 1923. Serial No. 682,254.

*To all whom it may concern:*

Be it known that I, WILLIAM K. MATTERN, a citizen of the United States, and resident of Germantown, Philadelphia, in the county of Philadelphia and State of Pennsylvania, have invented certain new and useful Improvements in Adjustable Sinkers, of which the following is a specification.

My invention relates to fishing sinkers, and especially to adjustable or variable-weight sinkers, in which one or any reasonable plurality of weights or "leads" may be quickly and easily placed together and secured to form an operative unit having the desired weight for the purpose in view, that is, with due regard to conditions of tide, wave, depth of water, bottom, and other variable conditions, as well understood by anglers.

It has heretofore been proposed to string a number of weights or leads on a stem or shank to form a variable-weight sinker, but within my knowledge no suitable provision has been made for properly securing the weights or holding them tightly together, and for otherwise providing easily operated and simple devices for associating the variable number of leads to form a practically "solid" and satisfactory operative unit.

A principal object of my invention, therefore, is to provide suitable means for so associating and securing together a variable number of weights or leads that they are tightly held in place, and form a practically solid unit which may, however, at any time be quickly manipulated to add or remove leads in accordance with varying fishing conditions.

The characteristics and advantages of the invention are further explained in connection with the following detail description of the accompanying drawings, which illustrate certain representative embodiments of the invention. After considering these embodiments, persons skilled in the art will understand that many variations may be made, and I contemplate the employment of any structures or devices that are properly within the scope of the appended claims.

Figure 1 is a perspective view of a sinker embodying the invention in one form.

Figure 2 is a vertical section.

Figure 3 is a similar section of a modified device.

Figure 4 is a perspective view of the stem or shank separate from the weights.

Figure 5 is a perspective view of a fastening wedge piece.

Figure 6 is a sectional view of another modified structure.

Figure 7 is a perspective view of the same.

To cooperate with one or more weights or leads, I provide a stem or shank member designated as a whole by reference letter S. This is desirably made of a strip of sheet metal of moderate width, bent to form a looped head 1, from which project two parallel shank members 2 of lengths sufficient to accommodate a number of leads. At the upper ends of the shank members are holes or eyes 3. Any number of leads or weights 4 may be placed over the shank members 2, the weights being provided with central apertures 5 to accommodate the shanks. Although the shape of the weights may vary considerably, they are desirably made substantially in the form of a short bar which is bent centrally at a moderate angle, so that the lower face of each weight forms in effect a socket 6 complemental to the upper convex portion 7 of the next lower weight. In the form of the invention shown in Figures 1, 2 and 3, all of the weights may be loose or separate from the shank structure S, and may be strung upon it in any desired number for the purpose in view, the lower weight resting on the loop head 1 of the shank, which is located in the socket 6 of the weight. Any suitable number of weights or leads having been put in position, they are so retained by the locking or wedge member W, Figure 5, which may be of sheet metal of moderate thickness, and the same width as the shank portions 2 previously mentioned. The wedge comprises a stem or shank portion 8, a tapered point or wedge proper 9, and an eye 10 at the upper end of the shank. The wedge or locking member is inserted between the upper or free portions of shank members 2 and pushed down until its point or wedge portion 9 is closely adjacent to the upper portion of the uppermost weight 4, and at that time its eye 10 is in line with the eyes 3 of shank members 2. The locking member is then secured by a ring or hooked portion 12, which is desirably formed as a part of a double hook or ring member R, including the hook portion 12 and a ring 13, for the convenient attachment of the line. The free end of the hook portion 12 may be placed slightly to one side to permit easy insertion in the eyes 3 and 10, or the hook may be easily bent to permit insertion, and then again bent to prevent dislocation of the hook member from the eyes.

When the wedge or locking member W is inserted in the manner described, the shank members 2 are spread apart closely adjacent to the upper end of the upper weight and secured tightly in position, and by contact with the lower weights they are also held tightly together, so that the complete device is a tightly secured operative unit, which may be at any time easily dismembered or disassembled by removing the hook member and wedge, changing the number of weights, inserting another suitable locking or wedge member, and replacing the hook member 12. Instead of a single locking or wedge member W, a plurality of such members $W^1$ may be provided, as sufficiently illustrated in Figure 3.

Figure 6 shows a modified structure, preferable in some cases, in which the lower weight 20 is cast around and integral with head 1 of the shank structure S. The additional weights 21 have relatively wide bores or sockets 22, surrounding the shank members 2, so that the point 9 of wedge W may be pushed down to a point substantially within the upper end of the socket or bore of the upper weight 21. This structure is otherwise substantially as in the previous example.

While I have shown certain modifications, it is not attempted to show all possible modifications of the invention, such other modifications being sufficiently indicated by the scope of the claims.

I claim:

1. A sinker comprising a stem which includes a head and parallel shank members extending therefrom, weights having apertures to accommodate the shank members and adapted to be placed in any convenient plurality thereon with the lower weight resting on the head, and a locking member adapted to be inserted between the shank members and serving to spread them and lock the weights in position.

2. A sinker comprising a stem which includes a head and parallel shank members extending therefrom, weights having apertures to accommodate the shank members and adapted to be placed in any convenient plurality thereon with the lower weight resting on the head, and a locking member adapted to be inserted between the shank members and serving to spread them and lock the weights in position, the upper ends of the shank members and locking member being provided with registering eyes, and a hook member adapted to be inserted through the eyes to hold the locking member in place.

3. A sinker comprising a stem which includes a head and parallel shank members extending therefrom, weights having apertures to accommodate the shank members and adapted to be placed in any convenient plurality thereon with the lower weight resting on the head, a locking member adapted to be inserted between the shank members and serving to spread them and lock the weights in position, the upper ends of the shank members and locking member being provided with registering eyes, a hook member adapted to be inserted through the eyes to hold the locking member in place, said hook member being operatively integral with an eye member for attachment of a line.

4. An adjustable sinker comprising a strip of sheet metal of substantial width, bent to form a looped head and parallel shanks extending from the head, the ends of the shanks being provided with eyes, a plurality of weights centrally apertured to accommodate the shanks and adapted to be placed in any suitable plurality thereon, a locking member consisting of a strip of sheet metal substantially the width of the said shanks and having one end tapered and an eye at the other end, the locking member being adapted to be inserted between the upper portions of the shanks with its tapered end wedged in between the shanks to spread them and lock the weights in position, and a hook member inserted through the eyes of the shanks and locking member to retain the latter in position.

5. A sinker comprising a stem consisting of a strip of sheet metal of substantial width, bent to form a looped head and parallel shank members extending therefrom, and a weight cast upon and about said head.

6. A sinker comprising a stem consisting of a strip of sheet metal of substantial width, bent to form a looped head and parallel shanks extending therefrom, the ends of the shanks being provided with eyes, a weight cast upon and about said shank head, a plurality of other weights centrally apertured to accommodate the shanks and adapted to be placed in any suitable plurality thereon, a locking member having one end tapered and an eye at the other end, the locking member being adapted to be inserted between the upper portions of the shanks with its tapered end wedged in between the shanks to spread them and lock the weights in position, and a hook member inserted through the eyes of the shanks and locking member to retain the latter in position.

Signed at Germantown, Philadelphia, in the county of Philadelphia and State of Pennsylvania this 30th day of November, A. D. 1923.

WILLIAM K. MATTERN.